US008615340B2

(12) United States Patent
Falkenstein

(10) Patent No.: US 8,615,340 B2
(45) Date of Patent: Dec. 24, 2013

(54) COORDINATION OF OPERATING MODES AND TORQUES FOR HYBRID VEHICLE DRIVES

(75) Inventor: Jens-Werner Falkenstein, Aalen (DE)

(73) Assignee: Robert Bosch GmbH, Stuttgart (DE)

( * ) Notice: Subject to any disclaimer, the term of this patent is extended or adjusted under 35 U.S.C. 154(b) by 925 days.

(21) Appl. No.: 12/296,122

(22) PCT Filed: Mar. 22, 2007

(86) PCT No.: PCT/EP2007/052775
§ 371 (c)(1),
(2), (4) Date: Apr. 13, 2010

(87) PCT Pub. No.: WO2007/115922
PCT Pub. Date: Oct. 18, 2007

(65) Prior Publication Data
US 2010/0198436 A1  Aug. 5, 2010

(30) Foreign Application Priority Data
Apr. 6, 2006  (DE) .......................... 10 2006 016 133

(51) Int. Cl.
*B60W 10/02*  (2006.01)
(52) U.S. Cl.
USPC ....................................... 701/22; 180/65.23
(58) Field of Classification Search
USPC ......... 701/22, 70; 180/65.275, 65.28, 65.285, 180/65.27; 322/16; 903/903, 945, 947; 318/9; 477/34, 118
See application file for complete search history.

(56) References Cited

U.S. PATENT DOCUMENTS

| | | | |
|---|---|---|---|
| 5,936,378 A * | 8/1999 | Iijima et al. .................... 318/807 |
| 6,705,416 B1 * | 3/2004 | Glonner et al. ............. 180/65.23 |
| 6,849,029 B2 | 2/2005 | Loeffler | |
| 6,887,180 B2 | 5/2005 | Pels et al. | |
| 2003/0119626 A1 * | 6/2003 | Loeffler ......................... 477/34 |
| 2007/0157899 A1 | 7/2007 | Seufert et al. | |

FOREIGN PATENT DOCUMENTS

| | | |
|---|---|---|
| DE | 4422647 | 1/1996 |
| DE | 19917665 | 10/2000 |
| DE | 10209514 | 10/2002 |
| DE | 10160819 | 6/2003 |
| WO | WO 2005/100777 | 10/2005 |

OTHER PUBLICATIONS

International Search Report, PCT International Patent Application No. PCT/EP2007/052775, dated Aug. 23, 2007.

* cited by examiner

*Primary Examiner* — Marthe Marc-Coleman
(74) *Attorney, Agent, or Firm* — Kenyon & Kenyon LLP

(57) ABSTRACT

A method for operating a driving device of a vehicle, in particular of a motor vehicle, that has as drive units at least one internal combustion engine and at least one electric machine whose torques are used for generating a drive torque of the vehicle as a function of different operating modes, and which has at least one signal flow controlling at least one drive unit in at least one operating mode, a single signal flow controlling at least one of the drive units in all operating modes by defining at least one torque limit.

21 Claims, 4 Drawing Sheets

COORDINATION OF OPERATING MODES AND TORQUES FOR HYBRID VEHICLE DRIVES

FIELD OF THE INVENTION

The present invention relates to a method for operating a driving device of a vehicle, in particular of a motor vehicle, which has as drive units at least one internal combustion engine and at least one electric machine whose torques are used for generating a drive torque of the vehicle as a function of different operating modes, and having at least one signal flow controlling at least one drive unit in at least one operating mode.

BACKGROUND INFORMATION

Conventional methods of the kind named at the beginning are available. For example, there are methods that use one signal flow respectively for different operating modes. For example, German Patent Application No. DE 101 60 819 B4 describes a control of the overrun operation of vehicle drives in which a driver is able to choose between different operating modes. The signal flow represents a control variable that defines one torque respectively for the drive units as a function of a drive setpoint torque. In the process, parameters, such as the charging state of an electric accumulator, for example, are taken into account in different manners in the different signal flows. In the event of a switch from one operating mode to the other, for example, in the event of a switch from the hybrid mode to the electric mode, the internal combustion engine may "rev up" due to the sudden loss of a counter torque when a coupling between the internal combustion engine and the electric machine is opened and may thereby cause unnecessary losses in the internal combustion engine on the one hand, and on the other hand may be experienced as uncomfortable by a driver. To create a continuous, "smooth" transition between the operating modes, costly functionalities are used that filter or ramp fluctuations caused by switching the operating mode.

SUMMARY

According to an example embodiment of the present invention, one single signal flow controls at least one of the drive units in all operating modes by defining at least one torque limit. By using a single signal flow, on the one hand, resources in a control device of the vehicle are only slightly loaded and on the other hand the disadvantages that arise when switching from one operating mode to the other, or from one signal flow to another, are eliminated. Using a single signal flow makes it possible for one operating mode to transition directly to the other. The use of one single signal flow is made possible by the definition of the at least one torque limit.

The driving device is advantageously operated in the hybrid, boost, recuperation, electric, internal combustion engine, or coasting operating modes. In the hybrid mode, the internal combustion engine and the electric machine are operated at the same time, the electric machine being used mainly as a generator. In the boost mode, a torque of the electric machine is activated in addition to a torque of the internal combustion engine, whereby a high acceleration is made possible. In the recuperation mode, the regenerative potential of the electric machine is utilized. In the electric mode, only the electric machine, and in the internal combustion engine mode, only the internal combustion engine is used to drive the vehicle. In the coasting mode (also known as rolling mode), neither the internal combustion engine, nor the electric machine transmit a torque to the drive wheels of the vehicle.

According to one further refinement of the present invention, the torque limit for switching at least one operating mode is modified. Thus, it is not a signal flow that is switched, but rather another operating mode is made possible by modifying a variable in a signal flow.

According to one further refinement of the present invention, an electric accumulator may be assigned to the electric machine, and when the electric machine is in the hybrid mode, a setpoint torque is defined as a function of a charging control. In most operating points, the setpoint torque is negative, which leads to a regenerative operation of the electric machine, and thus enables a charging of an electric accumulator.

The charging control is advantageously a function of the overall efficiency of the drive and/or exhaust-gas emissions of the driving device and/or a desired power output of an electric system of the vehicle. The charging control increases the regenerative power output of the electric machine, or shifts the setpoint torque farther into the negative torque range, if this achieves a more favorable overall efficiency of the entire driving device and produces favorable effects on the exhaust gas emissions. Furthermore, the charging control ensures that the desired power output of the electric system of the vehicle is achieved on average.

According to one further refinement of the present invention, an upper and/or a lower torque limit are/is defined for the electric machine.

Advantageously, at least one torque limit of the electric machine is defined as a function of the charging state of the electric accumulator assigned to the electric machine. In this way, for example, the upper torque limit of the electric machine may be selected such that no more torque is requested from the electric machine than is possible or would be sensible given the charging state of the electric accumulator. Likewise, the lower torque limit of the electric machine may be selected such that the electric accumulator is not overloaded in the regenerative mode, for example, in the recuperation mode.

Furthermore, it is advantageous if at least one torque limit of the electric machine is defined as a function of the electric machine temperature. This prevents the electric machine from overheating both in the regenerative and in the motor mode.

According to one further refinement of the present invention, an upper torque limit is defined for the boost mode for the internal combustion engine. If the drive setpoint torque requested by the driver exceeds the upper torque limit of the internal combustion engine, the internal combustion engine provides a torque up to the defined torque limit and the electric machine provides the missing torque. This enables a direct transition from hybrid mode to the boost mode, for example.

According to one further refinement of the present invention, a lower torque limit is defined for the recuperation mode for the internal combustion engine. If the driver does not actuate the gas pedal, a negative drive setpoint torque arises; additionally, this drive setpoint torque may be further shifted into the negative range by actuating the brake pedal. If a drive setpoint torque defined in this way undershoots the lower torque limit of the internal combustion engine, the torque still missing from the internal combustion engine is replaced by a torque of the electric machine (in the regenerative mode). Thus, a direct transition from the hybrid mode to the recuperation mode is also possible.

According to one further refinement of the present invention, at least one torque limit of the internal combustion engine is defined to restrict an operating range of the internal combustion engine. For example, as part of a heating strategy for a catalytic converter, it may be sensible to operate the internal combustion engine at low torques. This may be implemented through corresponding definitions for the upper and/or the lower torque limit of the internal combustion engine.

According to one further refinement of the present invention, in the boost mode, the upper torque limit of the electric machine is reduced in a ramp-shaped manner. The boost mode places a heavy load on the electric accumulator and the charging state decreases. To avoid an excessively strong discharge, the time duration of a single boost process may be limited by a ramp-shaped reduction of the boost torque right down to the value zero, for example. In this way, a reproducibility of the boost process may also be achieved.

Advantageously, for a switch from the hybrid mode to the electric mode or to the coasting mode, the torque limits of the internal combustion engine are changed to the torque of at least one accessory assigned to the internal combustion engine. By adjusting both torque limits of the internal combustion engine to the same value, a setpoint torque is automatically defined for the internal combustion engine, independently of a drive setpoint torque. If the internal combustion engine is not to provide a torque together with its accessories, then it must be taken into account that the accessories coupled with the internal combustion engine, such as, for example, generator or air-conditioner compressor, impart a (negative) torque on the driving device. Since no torque is to be provided by the internal combustion engine together with its accessories in the electric mode and in the coasting mode, the torque of the internal combustion engine must correspond to the value of the torque required by the accessories.

According to one further refinement of the present invention, an interrupting clutch is used between the internal combustion engine and the electric machine. This is used to mechanically separate the internal combustion engine from the electric machine when necessary.

Advantageously, the interrupting clutch is opened for the electric mode and/or the coasting mode. In this manner, the internal combustion engine is mechanically separated from the rest of the driving device.

The torque limits of the internal combustion engine are advantageously adjusted to the value zero for the electric mode and for the coasting mode when the interrupting clutch is open and the internal combustion engine is switched off. When the internal combustion engine is switched off, fuel is conserved, for example.

According to one further refinement of the present invention, for a switch to the coasting mode, the torque limits of the electric machine are adjusted to the value of the torque of at least one accessory assigned to the electric machine. As is the case in the internal combustion engine, here as well the electric machine, together with the accessories belonging to it, is adjusted to be torque-free by defining torque limits of the electric machine. In this manner, neither positive nor negative torques act on drive wheels of the vehicle, which means that the vehicle rolls freely or coasts.

According to one further refinement of the present invention, a starting clutch is used between the electric machine and a transmission of the vehicle, the transmission being operably connected to the drive wheels of the vehicle.

If the starting clutch is advantageously opened for the coasting mode, the electric machine and the internal combustion engine are mechanically uncoupled from the transmission.

Advantageously, the torque limits of the electric machine are then adjusted to the value zero for the coasting mode. Thus, in the coasting mode, both the electric machine and the internal combustion engine are switched off to conserve energy.

According to one further refinement of the present invention, all torque limits are continuously modified. Sudden torque modifications would greatly restrict the driving comfort by suddenly changing a noise level of the driving device or by jerking or vibrations in the driving device, for example.

BRIEF DESCRIPTION OF THE DRAWINGS

In the following text, the present invention is explained in greater detail with the aid of an exemplary embodiment.

DETAILED DESCRIPTION OF EXAMPLE EMBODIMENTS

Figure 1:
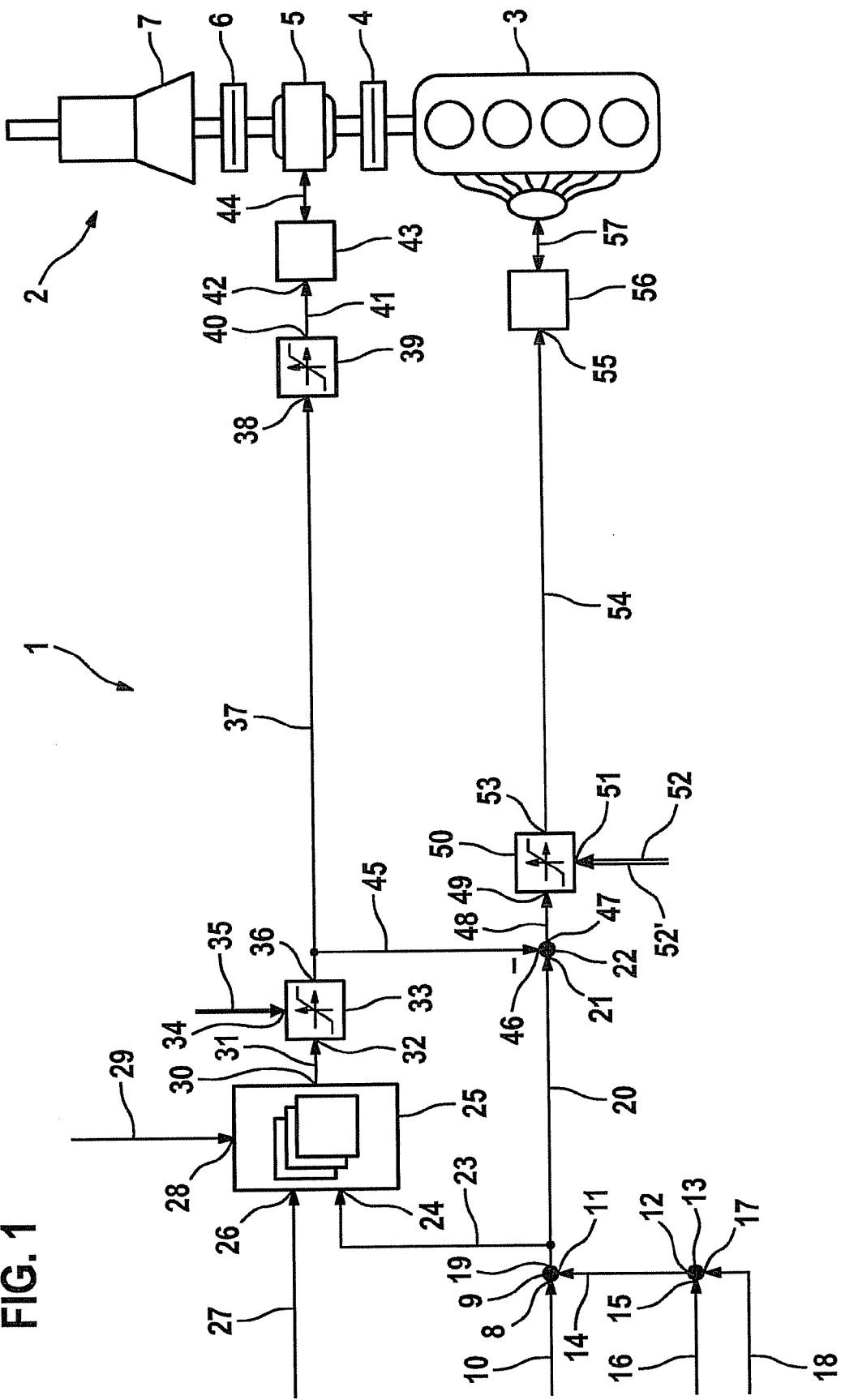
FIG. 1 shows one principle of torque coordination in the hybrid mode.

FIG. 1 illustrates a part of a signal flow 1 that is required for the hybrid mode of a driving device 2. In this context, the driving device is made up of an internal combustion engine 3 that is able to be operably connectable to an electric machine 5 via an interrupting clutch 4, electric machine 5 being operably connectable to a transmission 7 via a starting clutch 6. For dual clutch transmissions, starting clutch 6 represents one of the two clutches at the transmission inlet. For automatic transmissions, a torque converter may take the place of starting clutch 6, possibly with a converter and clutch unit. Transmission 7 is operably connected to the drive wheels of the vehicle.

A driver's desired torque 10 (trqDes) is available at an input 8 of an adder 9. A cumulative torque 14 existing at output 12 of an adder 13 is supplied to adder 9 at a further input 11 of adder 9; this cumulative torque is made up of a requested torque 16 available at input 15 of adder 13 for accessories that are directly coupled with electric machine 5 and a requested torque 18 available at input 17 for accessories that are directly coupled with internal combustion engine 3. At an output 19, adder 9 has a connection 20 to an input 21 of a subtracter 22. Furthermore, an additional connection 23 leads from connection 20 to an input 24 of a charging control 25. At another input 26, rotational speed 27 of electric machine 5 is supplied to charging control 25. At a further input 28, a desired power output 29 of an electric system is supplied to charging control 25. A connection 31 leads from an output 30 of charging control 25 to an input 32 of a limiter 33. An additional variable 35 is supplied to limiter 33 at a further input 34. A connection 37 leads from an output 36 of limiter 33 to an input 38 of an additional limiter 39, from which a connection 41 leads from an output 40 to an input 42 of a control unit 43, which communicates with electric machine 5 via a connection 44.

An additional connection 45 leads from connection 37 to an input 46 of subtracter 22, the value transmitted via connection 45 being supplied to the subtracter as a subtrahend. A connection 48 leads from an output 47 of subtracter 22 to an input 49 of a limiter 50. Further variables 52 and 52' are supplied to limiter 50. From an output 53 of limiter 50, a connection 54 leads to an input 55 of a control unit 56, which communicates via a connection 57 with internal combustion engine 3.

In the hybrid mode, interrupting clutch 4 and starting clutch 6 are closed so that the torques of internal combustion engine 3 and of combustion machine 5 are added to form a cumulative torque at starting clutch 6 and are transmitted in the output direction via transmission 7. In this context, internal combustion engine 3 and electric machine 5 are to generate together the cumulative setpoint torque existing at output 19 of adder 9, which is made up of the driver's desired torque 10 and torques 16 and 18 of the accessories. Charging control 25 ascertains for electric machine 5 an unlimited setpoint torque, which exists at output 30 of charging control 25, as a function of the cumulative setpoint torque, rotational speed 27 of electric machine 5, and average electric desired power output 29. The charging control has the task of increasing the regenerative power output of electric machine 5 if a more favorable overall efficiency of driving device 2 is achieved in this manner and favorable effects are produced on the exhaust gas emissions; of decreasing it appropriately in the event of poor marginal conditions, and of satisfying desired power output 29 of the electric system on average. In most operating points, the ascertained setpoint torque for electric machine 5 is negative, which leads to a regenerative operation of electric machine 5. The unlimited setpoint torque for electric machine 5 is limited by limiter 33. It receives present operating limits of electric machine 5 as variable 35, which is a function of a charging state of an electric accumulator assigned to electric machine 5, and/or of the operating temperature of electric machine 5, for example. In the hybrid mode, the setpoint torque limited in this way corresponds to the setpoint torque of electric machine 5.

The setpoint torque of internal combustion engine 3 results from the cumulative setpoint torque, from which the setpoint torque of electric machine 5 is deducted in subtracter 22. Additionally, the setpoint torque of internal combustion engine 3 is limited in limiter 50 by lower torque limit 52 and upper torque limit 52' of internal combustion engine 3.

In the hybrid mode, charging control 25 defines the setpoint torque for electric machine 5 and thus has a higher priority than the driver's desired torque 10. This means that an excessively high driver's desired torque 10 is not implemented because of the limitation by limiter 50.

Signal flow 1 shown in FIG. 1 is valid for a virtually stationary operation. Measures for dynamic compensation, that is, an activation of electric machine 5 to balance out a turbo lag of an internal combustion engine, for example, are not shown.

Figure 2:
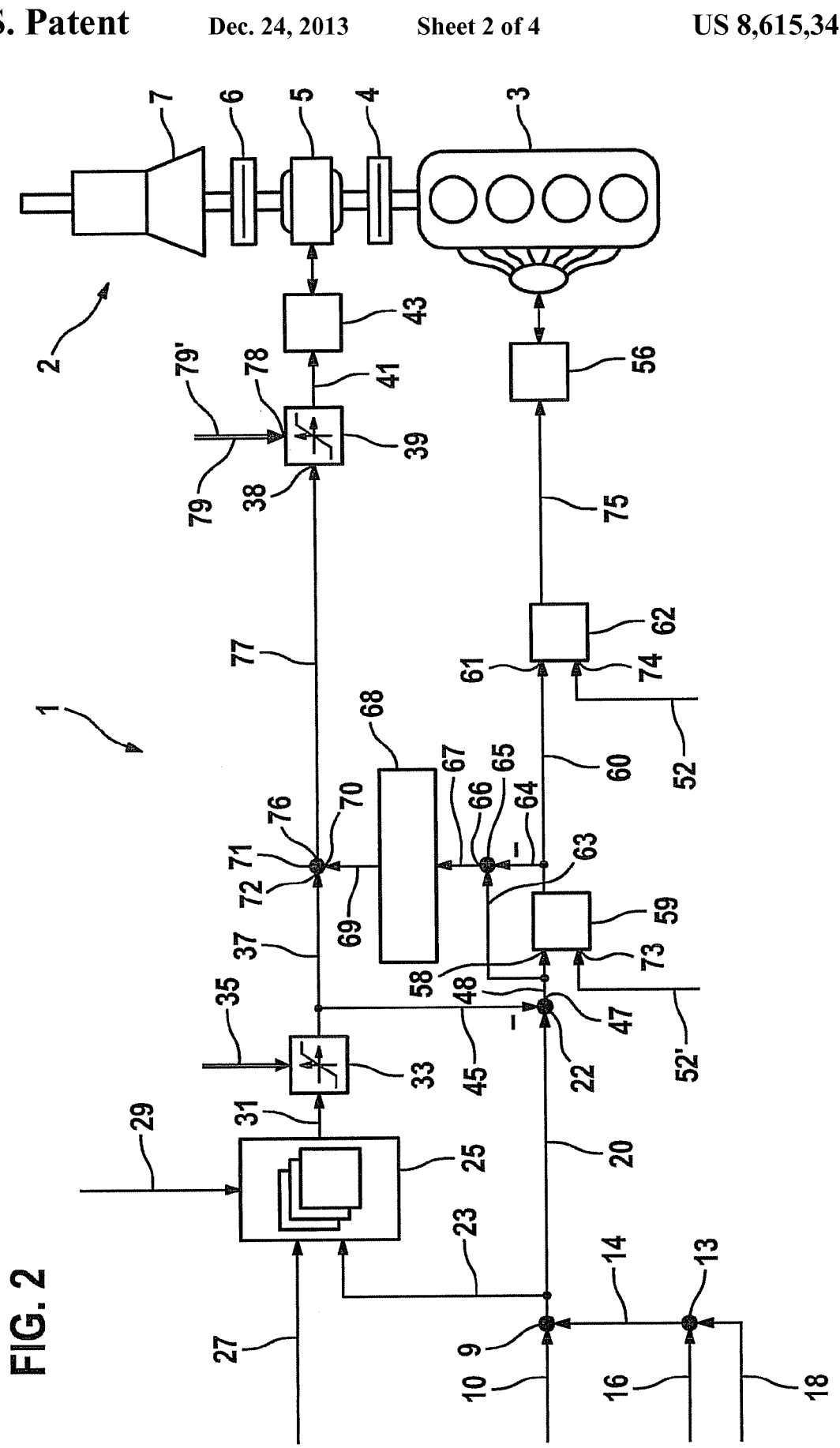
FIG. 2 shows one principle of torque coordination in the boost mode.

FIG. 2 shows an extension of signal flow 1 from FIG. 1 in order to enable a boost mode. In this mode, the driver's desired torque 10 is given a higher priority than the charging control. In this case, connection 48 leads from output 47 of subtracter 22 to an input 58 of an element 59, from which an additional connection 60 leads to an input 61 of an additional element 62. A connection 63 and 64 respectively lead from connection 48 and connection 60 to a subtracter 65, the value coming from connection 60 being deducted from the value that comes from connection 48. A connection 67 leads from an output 66 of subtracter 65 to a limiting element 68. A further connection 69 leads from there to an input 70 of an adder 71, which has connection 37 at an additional input 72. At an additional input 73, upper torque limit 52' of internal combustion engine 3 is supplied to element 59. Element 59 transmits the smaller value of its two inputs 58 and 73 via connection 60. At an input 74, lower torque limit 52 of internal combustion engine 3 is supplied to element 62, from which a connection 75 leads to control unit 56. Element 62 transmits the larger value of its two inputs 61 and 74 via connection 75. A connection leads from an output 76 of adder 71 to input 38 of limiter 39. At an input 78 of limiter 39, a lower torque limit 79 and an upper torque limit 79' for electric machine 5 are supplied to limiter 39.

When a very high driver's desired torque 10 is defined, the setpoint torque of internal combustion engine 3 reaches upper torque limit 52'. If an unlimited setpoint torque for the internal combustion engine available at input 58 of element 59 is greater than upper torque limit 52', the limitation by element 59 becomes active. A limited setpoint torque for the internal combustion engine transmitted via connection 60 then corresponds to the upper torque limit 52'. At the output of subtracter 65, a boost torque develops that takes on a value larger than or equal to zero and corresponds to the difference between the unlimited setpoint torque and the limited setpoint torque for the internal combustion engine. Adder 71 additionally applies the boost torque to the setpoint torque of electric machine 5 via connection 67 and 69. Limiter 39 limits the new setpoint torque of electric machine 5 using lower torque limit 79 and upper torque limit 79'. In the boost mode, the setpoint torque required by the charging control is not maintained since the additional boost torque has an effect. In general, the limited energy content of the electric accumulator mentioned in FIG. 1 is thereby reduced. To avoid an excessive discharge or to be able to reproduce the boost process, a downward regulation of the boost mode is provided by limiting element 68, which influences the boost torque. For example, limiting element 68 may limit the time duration of an individual boost process by reducing the boost torque in a ramp-shaped manner right down to the value zero. Thus, the limited energy content of the electric accumulator may be distributed among multiple boost processes.

Signal flow 1 shown in FIG. 2 thus enables a continuous transition from the hybrid mode to the boost mode.

Figure 3:
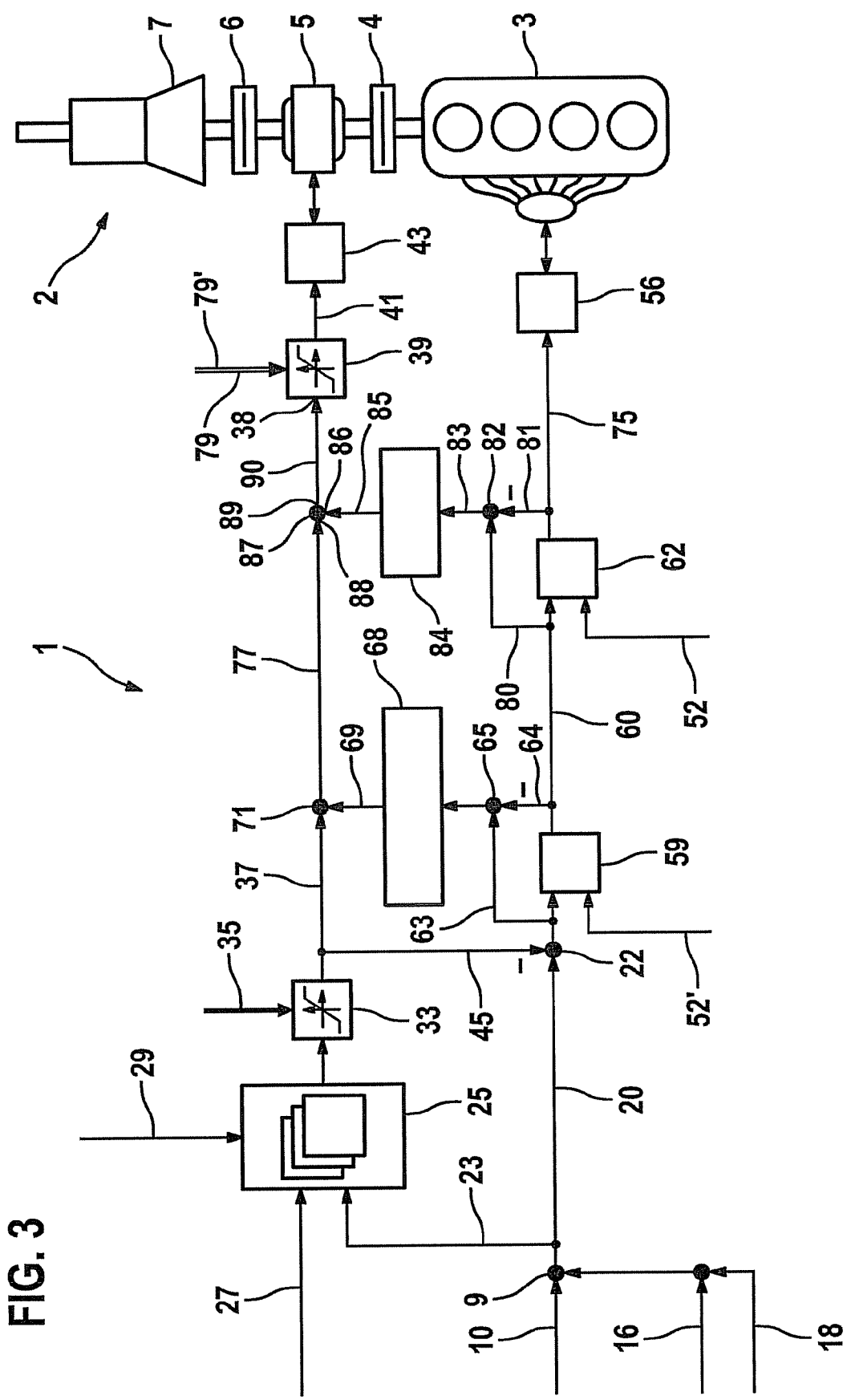
FIG. 3 shows one principle of torque coordination in the recuperation mode.

FIG. 3 illustrates signal flow 1 from FIG. 2 with an extension to enable a recuperation mode. To this end, an additional diagonal path between internal combustion engine setpoint torque and electric machine setpoint torque is provided. A connection 80 and 81 respectively lead from connection 60 and from connection 75 to a subtracter 82, from which a connection 83 leads to a limiting element 84, from which a connection 85 leads to an input 86 of an adder 87, connection 77 being assigned to adder 87 at a further input 88. In this context, a connection 90 leads from an output 89 of adder 87 to input 38 of limiter 39.

If the driver does not actuate the gas pedal, a negative driver's desired torque arises, which may be further shifted in the negative direction by actuating the brake pedal. If in this context the defined lower torque limit 52 of the internal combustion engine is undershot, a recuperation torque is applied to electric machine 5. This arises when the setpoint torque of internal combustion engine 3 is actively limited by element 62. Lower torque limit 52 of internal combustion engine 3 may characterize the drag torque or the minimal torque of internal combustion engine 3 during injection mode depending on whether deceleration fuel cutoff is permitted or possible. In the recuperation mode as well, the setpoint torque of electric machine 5 set by the charging control is not maintained. Limiting element 84 limits the recuperation torque if the charging state of the electric accumulator is too high, for example. Like in the boost mode, here too a continuous transition from the hybrid mode to the recuperation mode takes place.

The diagonal paths for boost mode and recuperation mode may also be used to restrict possible operating ranges of the internal combustion engine. For example, an operation of the internal combustion engine 3 at low torques may be sensible as part of a heating strategy for a catalytic converter. It may be achieved by the corresponding restriction of torque limits 52 and 52' of internal combustion engine 3. Preferably, abrupt changes of the torque limits are avoided in this context. The limitations by limiting elements 68 and 84 are to be accordingly adjusted to the restricted operating ranges of internal combustion engine 3.

To enable the electric mode, the interrupting clutch 4 must be opened. The internal combustion engine is switched off and thus the accessories that are coupled with the internal combustion engine are also at standstill, which means that torque 18 of the accessories has the value zero. The signal flow is further calculated with torque limits 52 and 52', each of these having the value zero. The influence of the charging strategy is compensated during calculation. In this context, the calculation of the setpoint torque of electric machine 5 by charging control 25 may be omitted in order to save processing time. In this context, the setpoint torque value of electric machine 5 available at the output of charging control 25 may be set to zero. Limiting elements 68 and 84 are either deactivated or are used to limit the driving and decelerating in the electric mode.

In the coasting mode, starting clutch 6 is open and internal combustion engine 3 and electric machine 5 are stationary. Signal flow 1 is further calculated using the torque limits 52, 52', 79 and 79' equal to zero.

Alternatively, for the coasting mode, interrupting clutch 4 may be opened, whereby the internal combustion engine is disengaged. If torque limits 79 and 79' of electric machine 5 are changed to the value of torque 16 of the accessories coupled with electric machine 5, then the electric machine generates the torque required by the accessories and the output is torque-free, independently of the driver's desired torque 10. In this context, the calculation of the setpoint torque of electric machine 5 by charging strategy 25 may be omitted where necessary in order to save processing time. In this context, the value of the setpoint torque of electric machine 5 available at the output of charging control 25 is set to zero.

Figure 4:
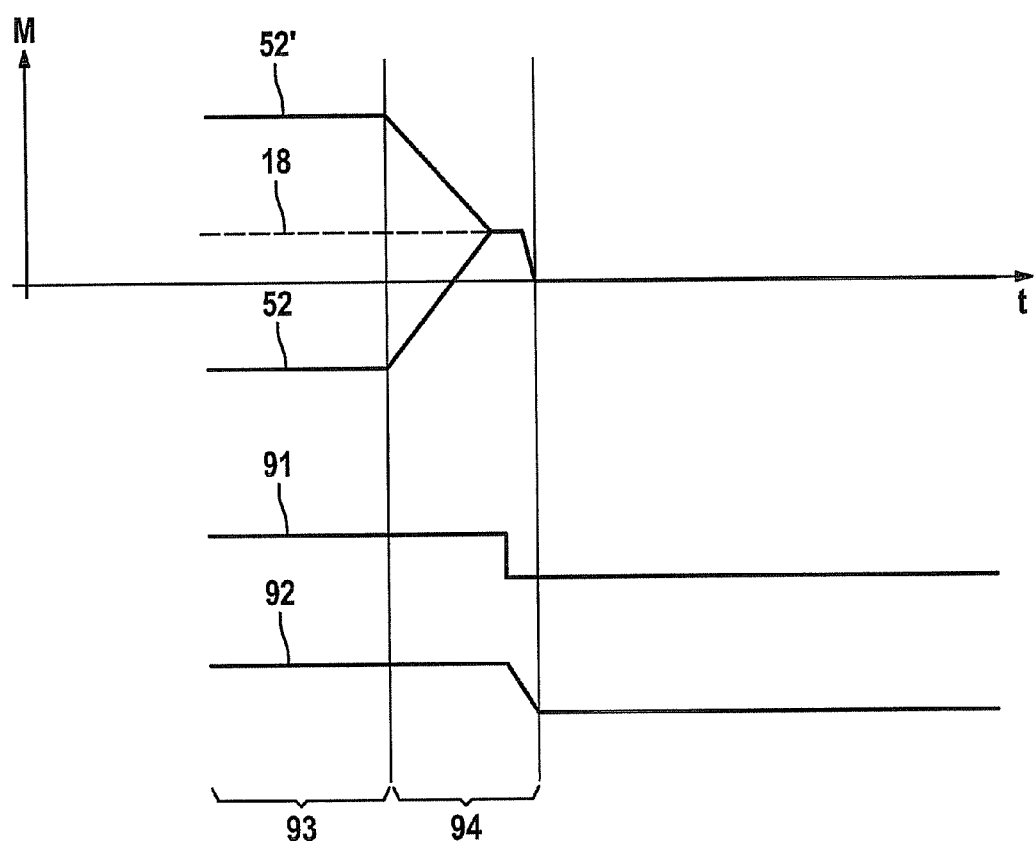
FIG. 4 shows one principle of torque coordination during the transition from the hybrid mode to the electric mode.

FIG. 4 illustrates exemplarily the transition from the hybrid mode to the electric mode. In this context, the curve of lower torque limit 52 and of upper torque limit 52' of internal combustion engine 3 are plotted over the time as are torque 18 of the accessories assigned to the internal combustion engine and a status curve 91 of interrupting clutch 4 as well as a status curve 92 of internal combustion engine 3. During the transition from hybrid mode to electric mode, both torque limits 52 and 52' of internal combustion engine 3 are adjusted in a ramp-like manner from the values applying in hybrid operation, shown in left region 93 of the diagram, to the value of torque 18 of the accessories assigned to internal combustion engine 3 during transition state 94, shown in the center region of the diagram. Internal combustion engine 3 then generates precisely that torque that is required by the accessories. Interrupting clutch 4 disposed between internal combustion engine 3 and electric machine 5 becomes torque-free in this instance and may be opened. This is represented by a jump in status curve 19. Subsequently, when internal combustion engine 3 is shut off, the rotational speed of internal combustion engine 3 falling to zero, which is represented by a ramp-shaped change of status curve 92, the directly coupled accessories also become stationary. It is thus valid that both torque 18 of the accessories assigned to internal combustion engine 3 and upper torque limit 52' and lower torque limit 52 of internal combustion engine 3 have the value zero.

For example, the transition from the hybrid mode to the coasting mode may occur in a similar manner. In this process, both torque limits 52 and 52' of internal combustion engine 3 are adjusted in a ramp-shaped manner to the value of torque 18 of the accessories assigned to internal combustion engine 3 while both torque limits 79 and 79' of electric machine 5 are adjusted in a ramp-shaped manner to the value of torque 16 of the accessories assigned to electric machine 5. In the process, starting clutch 6 becomes torque-free and may be opened. Internal combustion engine 3 and electric machine 5 are switched off, it being valid then, when stationary, that both torque 18 of the accessories assigned to internal combustion engine 3 and torque 16 of the accessories assigned to electric machine 5 are equal to zero. Likewise, torque limits 52 and 52' of internal combustion engine 3 and torque limits 79 and 79' of electric machine 5 are equal to zero. Also in the second variant of the coasting mode, having an open interrupting clutch 4, in which electric machine 5 generates the torque required by the directly coupled accessories, takes place by ramping torques 52 and 52' according to the transition into electric driving. The calculation of the setpoint torque of electric machine 5 by charging control 25 may be omitted where necessary in order to save processing time. In this context, the setpoint torque of electric machine 5 available at the output of charging control 25 may be set to zero, for example.

What is claimed is:

1. A method for operating a driving device of a motor vehicle, including at least one internal combustion engine and at least one electric machine as drive units, the method comprising:
generating a drive torque of the vehicle as a function of different operating modes of the driving device using torques of the drive units;
controlling at least one of the drive units in at least one operating mode using at least one signal flow; and
controlling at least one of the drive units in all operating modes using a single signal flow by defining at least one torque limit.

2. The method as recited in claim 1, wherein the operating modes of the driving device include at least one of hybrid mode, boost mode, recuperation mode, electric mode, internal combustion engine mode, and coasting mode.

3. The method as recited in claim 2, wherein the torque limit is modified for switching at least one operating mode.

4. The method as recited in claim 1, wherein an electric accumulator is assigned to the electric machine, and in a hybrid mode, a setpoint torque is defined for the electric machine as a function of a charging control for the electric accumulator.

5. The method as recited in claim 4, wherein the charging control is a function of an overall efficiency of at least one of a drive and exhaust-gas emissions of the driving device, and a desired power output of an electric system of the vehicle.

6. The method as recited in claim 1, wherein at least one of an upper and a lower torque limit is defined for the electric machine.

7. The method as recited in claim 4, wherein at least one torque limit is defined for the electric machine as a function of a charging state of the electric accumulator assigned to the electric machine.

8. The method as recited in claim 1, wherein at least one torque limit is defined for the electric machine as a function of a temperature of the electric machine.

9. The method as recited in claim 1, wherein an upper torque limit is defined for the internal combustion engine for a boost mode.

10. The method as recited in claim 1, wherein a lower torque limit is defined for the internal combustion engine for a recuperation mode.

11. The method as recited in claim 1, wherein at least one torque limit of the internal combustion engine is defined for restricting an operating range of the internal combustion engine.

12. The method as recited in claim 1, wherein in a boost mode, an upper torque limit of the electric machine is reduced in a ramp-like manner.

13. The method as recited in claim 1, wherein for a switch from the hybrid mode to the electric mode or to the coasting mode, torque limits of the internal combustion engine are modified to a torque of at least one accessory assigned to the internal combustion engine.

14. The method as recited in claim 1, wherein an interrupting clutch is used between the internal combustion engine and the electric machine.

15. The method as recited in claim 14, wherein the interrupting clutch is opened for at least one of an electric mode, and a coasting mode.

16. The method as recited in claim 15, wherein torque limits of the internal combustion engine are modified to a zero value for the electric mode and the coasting mode.

17. The method as recited in claim 16, wherein for a switch to the coasting mode, the torque limits of the electric machine are adjusted to a value of a torque of at least one accessory assigned to the electric machine.

18. The method as recited in claim 15, wherein a starting clutch is used between the electric machine and a transmission.

19. The method as recited in claim 18, wherein the starting clutch is opened for the coasting mode.

20. The method as recited in claim 15, wherein the torque limits of the electric machine are adjusted to the value zero for the coasting mode.

21. The method as recited in claim 1, wherein all torque limits are continuously modified.

* * * * *

UNITED STATES PATENT AND TRADEMARK OFFICE
CERTIFICATE OF CORRECTION

PATENT NO.       : 8,615,340 B2                                Page 1 of 1
APPLICATION NO.  : 12/296122
DATED            : December 24, 2013
INVENTOR(S)      : Jens-Werner Falkenstein It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1480 days.

Signed and Sealed this

Twenty-second Day of September, 2015

Michelle K. Lee
*Director of the United States Patent and Trademark Office*